United States Patent
Joppe et al.

(10) Patent No.: US 7,806,674 B2
(45) Date of Patent: Oct. 5, 2010

(54) AIR RING FOR CONTROLLING BLOWN FILM THICKNESS PROVIDED WITH INDIVIDUAL HEAT CONDUCTING SEGMENTS

(75) Inventors: Markus Joppe, Ibbenbueren (DE); Juergen Linkies, Lienen (DE); Martin Backmann, Lengerich (DE)

(73) Assignee: Windmoeller & Hoelscher KG, Lengerich (DE)

( * ) Notice: Subject to any disclaimer, the term of this patent is extended or adjusted under 35 U.S.C. 154(b) by 1321 days.

(21) Appl. No.: 11/214,803

(22) Filed: Aug. 31, 2005

(65) Prior Publication Data

US 2006/0049538 A1    Mar. 9, 2006

Related U.S. Application Data

(60) Provisional application No. 60/606,101, filed on Sep. 1, 2004.

(51) Int. Cl.
*B29C 47/00* (2006.01)

(52) U.S. Cl. .................. 425/72.1; 425/326.1; 264/40.6

(58) Field of Classification Search ................ 264/40.6; 425/378.1, 72.1, 326.1
See application file for complete search history.

(56) References Cited

U.S. PATENT DOCUMENTS

| | | | |
|---|---|---|---|
| 3,677,675 A * | 7/1972 | Brown ........................ 425/107 |
| 4,145,177 A * | 3/1979 | Schott, Jr. .................... 425/445 |
| 4,272,231 A * | 6/1981 | Schott, Jr. ................... 425/72.1 |
| 4,750,874 A * | 6/1988 | Keim .......................... 425/72.1 |
| 5,281,375 A * | 1/1994 | Konermann ................ 264/40.3 |
| 5,288,219 A * | 2/1994 | Smith ......................... 425/72.1 |
| 5,468,134 A * | 11/1995 | Cree .......................... 425/72.1 |
| 5,580,582 A * | 12/1996 | Achelpohl .................. 425/72.1 |
| 6,783,344 B1 * | 8/2004 | Rudolf ....................... 425/72.1 |
| 2004/0101589 A1 * | 5/2004 | Babin ......................... 425/549 |

* cited by examiner

*Primary Examiner*—Khanh Nguyen
*Assistant Examiner*—Saeed M Huda
(74) *Attorney, Agent, or Firm*—Jacobson Holman PLLC

(57) ABSTRACT

An air ring with increased-control over the gauge uniformity of blown plastic film in a film extrusion device. The air ring includes a generally annular plenum, an annular orifice for discharging cooling air against an extruded plastic tube passing through the air ring, and a flow path for cooling air between the plenum and the annular orifice. The air flow path is segmented along a circumference of the annular plenum, the segments including a material with high heat conductivity and guiding the air from the annular plenum to the orifice. Heating elements are provided for individually and selectively heating the segments of the air flow path such that the temperature of the cooling air discharge against the extruded plastic tube can be locally varied.

17 Claims, 11 Drawing Sheets

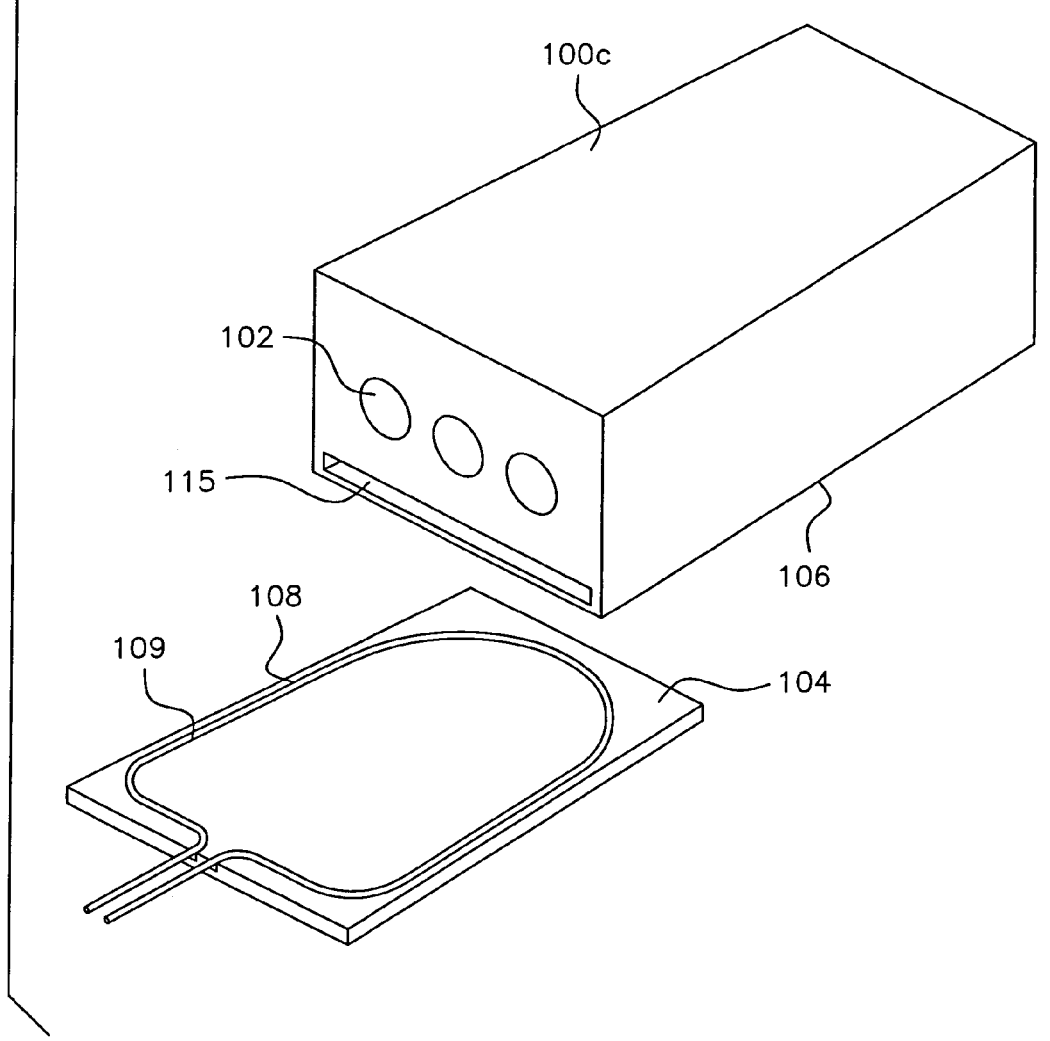

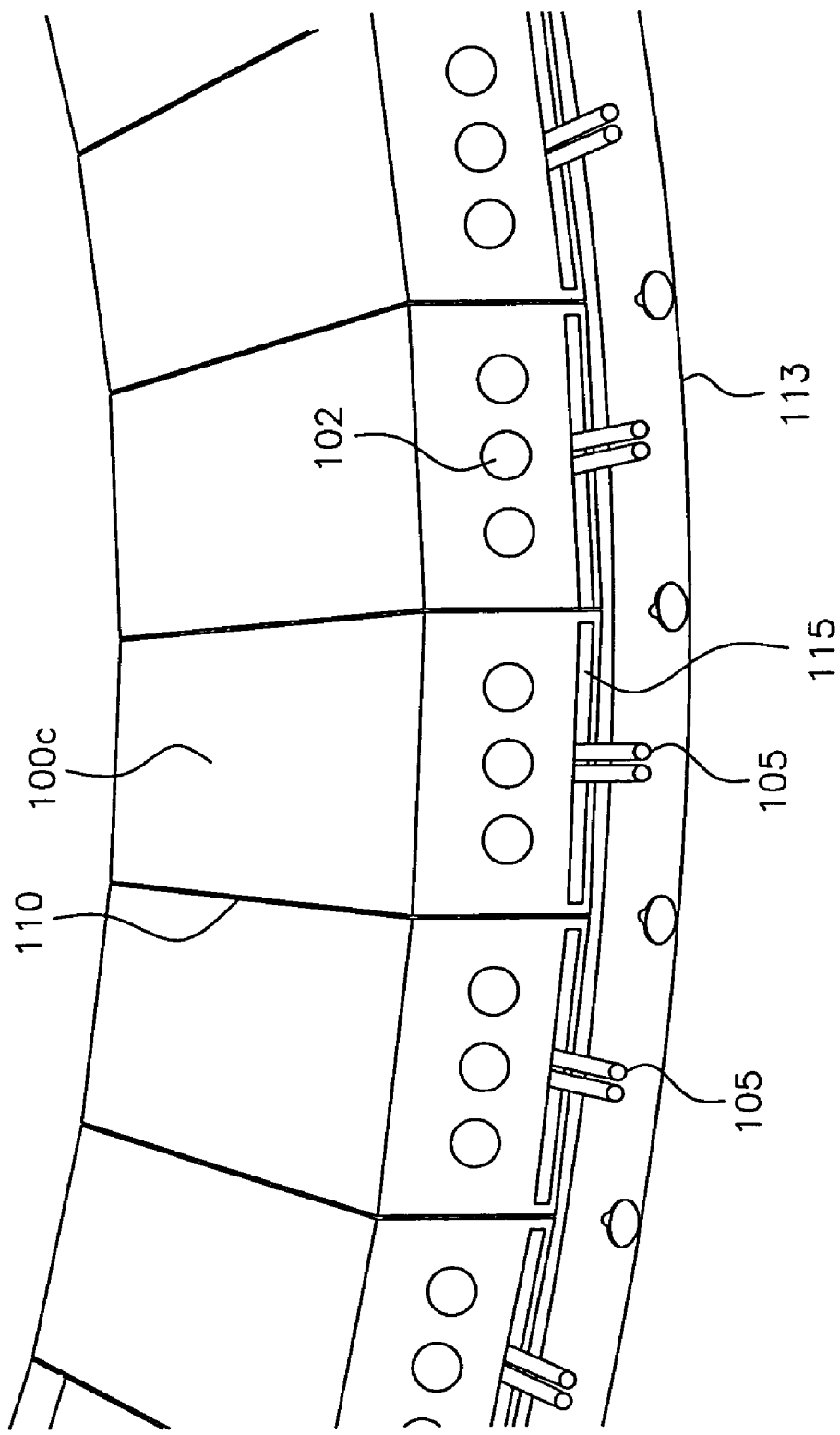

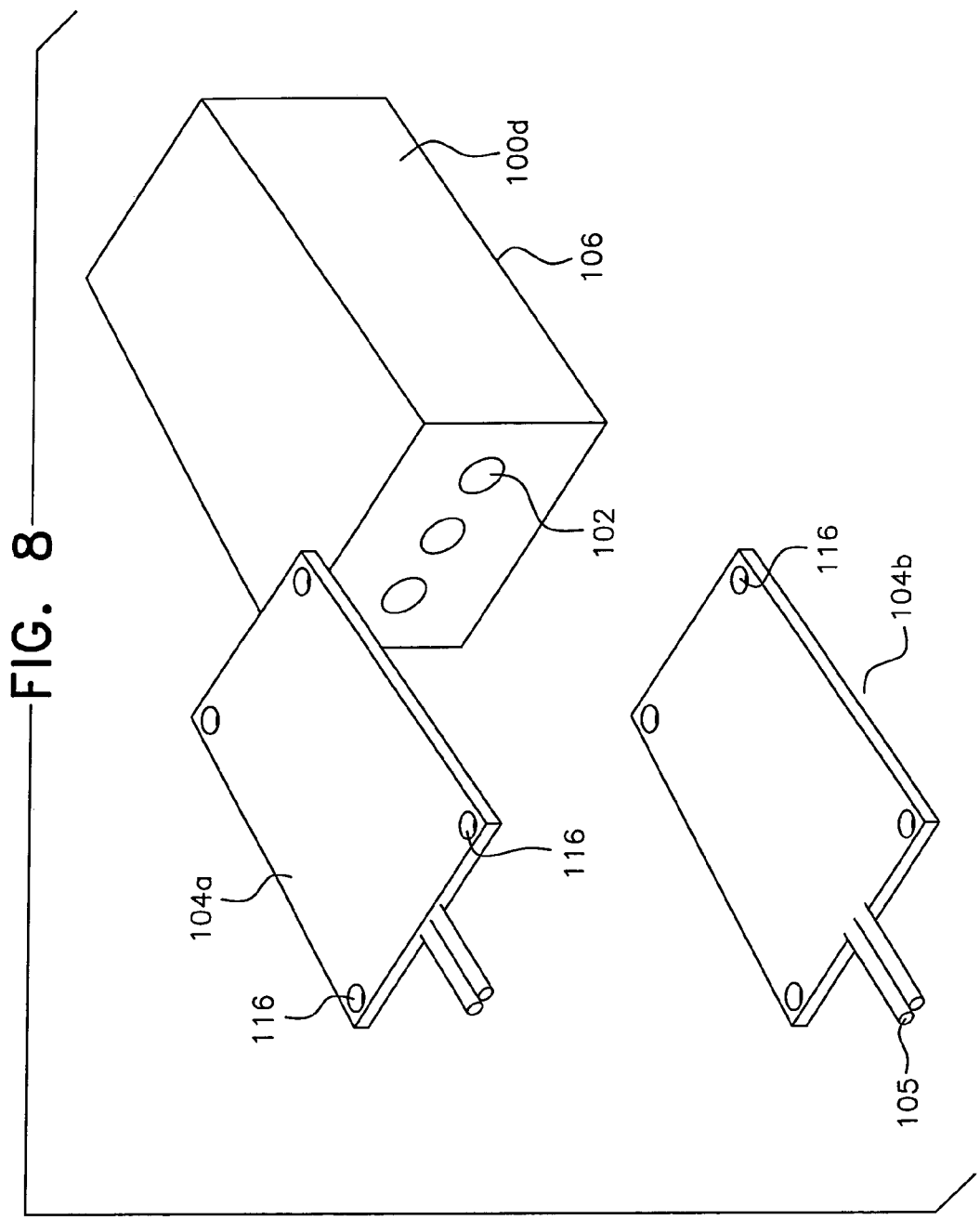

AIR RING FOR CONTROLLING BLOWN FILM THICKNESS PROVIDED WITH INDIVIDUAL HEAT CONDUCTING SEGMENTS

This is a complete application claiming benefit of provisional 60/606,101 filed Sep. 1, 2004.

BACKGROUND OF THE INVENTION

1. Field of the Invention

This invention relates to an air ring for controlling gauge uniformity in the manufacture of blown plastic film.

2. Description of the Related Art

Production of plastic foils by film bubble blow extrusion systems is well known. A lot of publications deal with developments in this technical field, including U.S. Pat. No. 6,702,563 B2, U.S. Pat. No. 5,951,926 and U.S. Pat. No. 5,505,601.

High end blown film extrusion devices are provided with a means for closed loop control of the width of the foil which is extruded. As a consequence, the thickness profile of the blown film bubble is measured over its circumference.

U.S. Pat. No. 5,135,689 shows such a sensor or measuring device. Based on the measurements, the viscosity of the just-extruded plastic is lowered in areas of the circumference of the foil tube in which the foil is too thick or increased in areas in which it is too thin. Then, the thermoplastic foil material is stretched to its final size by the air pressure inside the foil tube. By that, the areas of the foil tube with a low viscosity are further stretched than are the areas with high viscosity so that the width of the foil is balanced and nearly even over the circumference of the foil tube.

The above depicted influence of the viscosity of the extruded plastic material is preferably performed by a local variation of the temperature of the air which is blown against the foil to cool the just-extruded foil. This method is mentioned in U.S. Pat. No. 5,135,689 and U.S. Pat. No. 5,951,929. Another possibility is to locally vary the volume of the air blown against the foil. A third possibility is to locally vary the temperature of the molt in the extruder die head as shown in U.S. Pat. No. 4,339,403. The local variation of the temperature of the cooling air is described in U.S. Pat. No. 5,288,219. Canadian Patent No. 2,438,493 describes a beneficial system for producing tubular film which uses two of these three possibilities to locally vary the viscosity of the just-extruded foil. The above mentioned U.S. Pat. No. 5,288,219 locally varies the temperature of the cooling air with a cooling air ring. This air ring surrounds the just blown gauge.

The air ring typically comprises a generally annular plenum, an annular orifice for discharging cooling air against an extruded plastic tube passing through the air ring, and a flow path for cooling air between the plenum and the annular orifice.

The air flow path is provided with a plurality of cartridge heaters which extend in the air flow path and which heat the cooling air. Each cartridge heater can be individually supplied with current so that each cartridge heater can have a different temperature which results in a different temperature of the cooling air which passes by different cartridge heaters. By this, the temperature of the cooling air is locally varied around the circumference of the gauge. It is a lasting and constant desire of engineers to further improve the above described closed loop control of the film thickness. Hence, a need exists for an improved structure for increasing control over the gauge uniformity of blown plastic film in a film extrusion device.

SUMMARY OF THE INVENTION

This problem is solved according to the present invention in which the airflow-path is segmented along the circumference of the annular plenum. The resulting segments comprise a material with relatively high heat-conductivity. Before reaching the orifice, the air is guided by the segments. The segments can be individually and selectively heated by heating means. Thereby, the temperature of the cooling air discharge against the extruded plastic tube can be locally varied in the desired way. These measures considerably improve the transfer of heat from any kind of heating means to the cooling air. This is extremely beneficial if the heat is produced by a heating means having a small surface such as a cartridge heater, and most heating means common to industrial practice have a small hot surface. Therefore, the present invention is extremely beneficial with all these kinds of heating means. The present invention is further characterized by the patent claims and the following detailed description of preferred embodiments.

BRIEF DESCRIPTION OF THE DRAWINGS

The individual figures show:

FIG. 7a is an exploded view of a fourth preferred embodiment of a segment, according to the present invention.

FIG. 7b shows a plurality of segments as shown in FIG. 7a arranged in the air ring, in accordance with the present invention.

FIG. 8 is an exploded view of a fifth preferred embodiment of a segment, according to the present invention.

DETAILED DESCRIPTION OF THE PREFERRED EMBODIMENTS

Further scope of applicability of the present invention will become apparent from the detailed description given hereinafter. However, it should be understood that the detailed description and specific example, while indicating a preferred embodiment of the invention, is given by way of illustration only, since various changes and modifications within the spirit and scope of the invention will become apparent to those skilled in the art from this detailed description.

Figure 1:
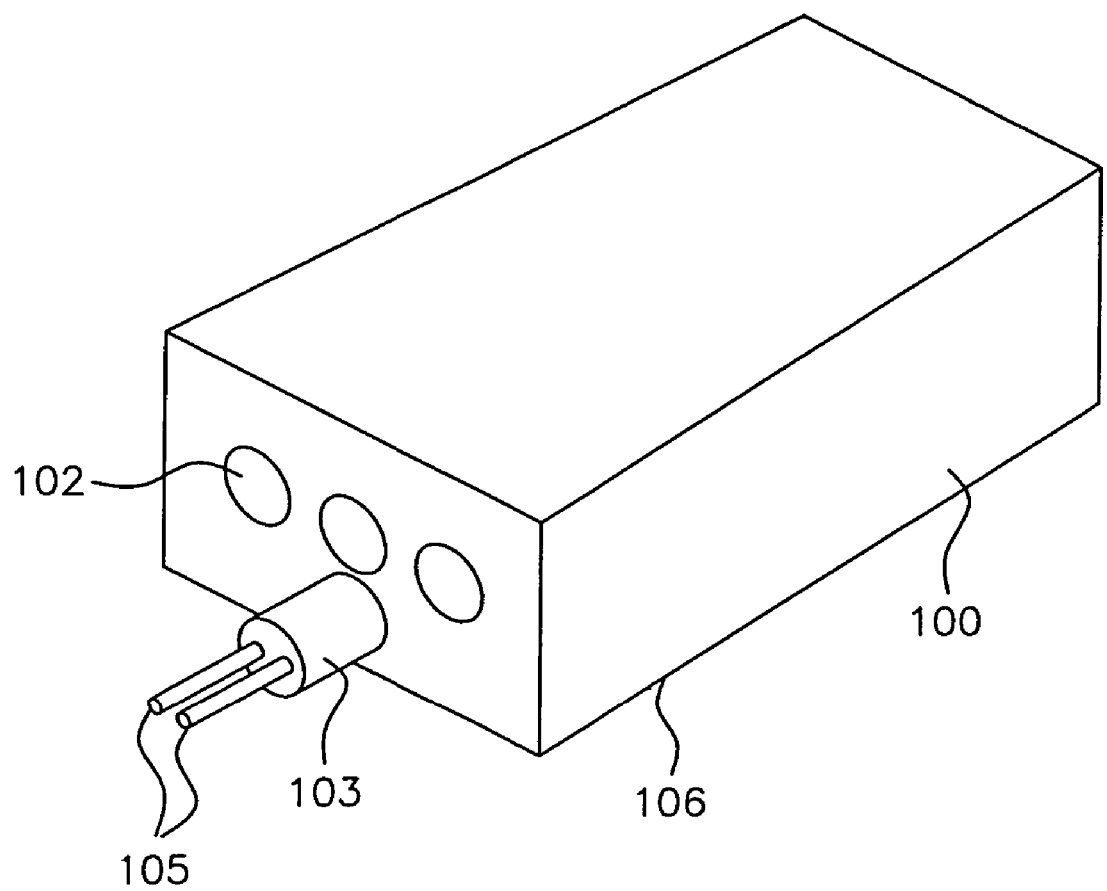
FIG. 1 is a sketch of a first preferred embodiment of a segment, according to the present invention.

FIG. 1 shows a segment 100 which is heated by a cartridge heater 103. The segment 100 is provided with holes 102 for guiding the cooling air. The cartridge heater 103 is placed in a hole in the base portion 106 of the segment 100. The cartridge heater 103 which serves as heating means for the segment 100 has electrical connectors 105.

Figure 2:
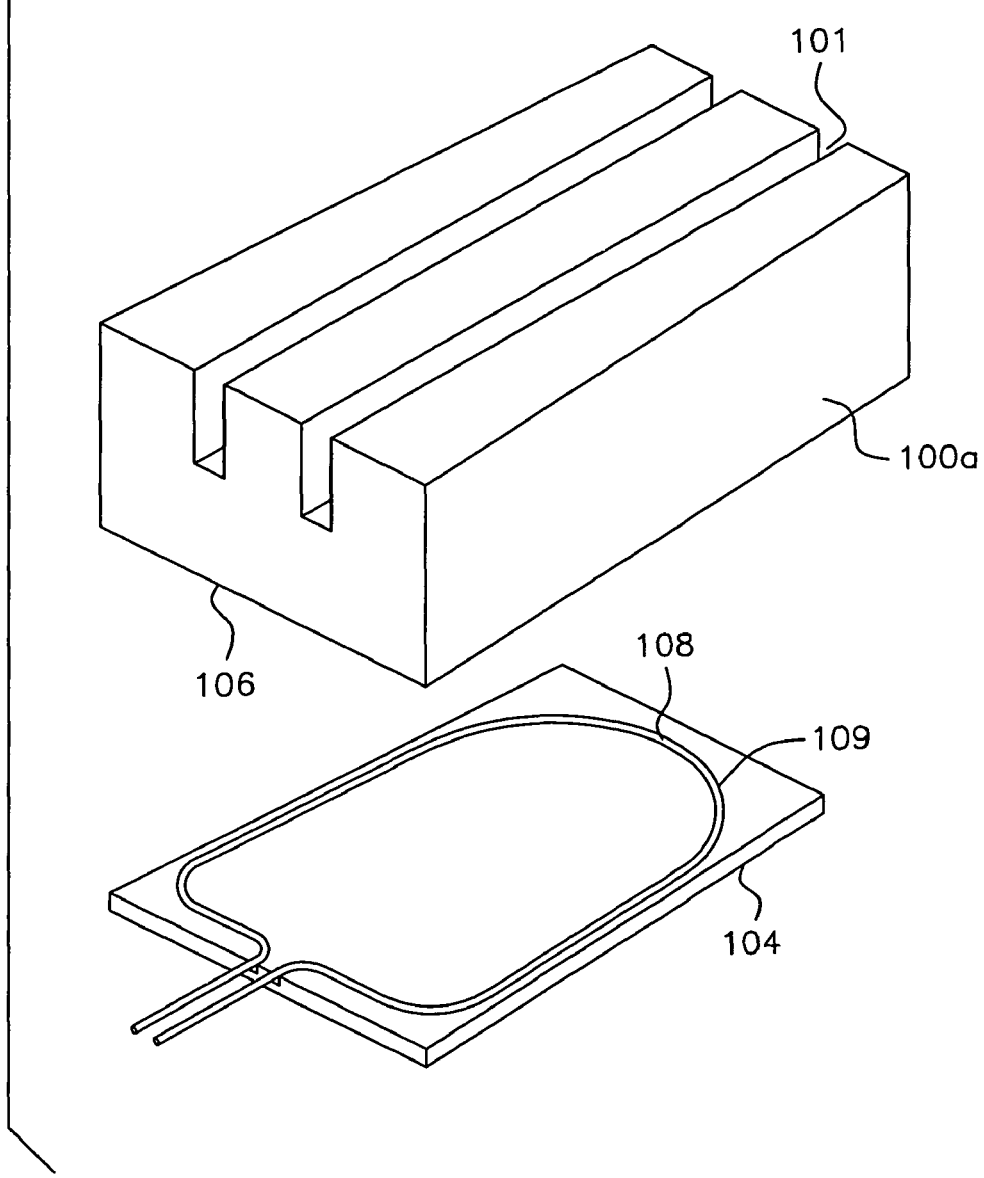
FIG. 2 is an exploded view of a second preferred embodiment of a segment, according to the present invention.

FIG. 2 shows a segment 100*a* which is heated by a hot plate 104. There is a groove 108 in the hot plate 104. This groove 108 contains the coil heater 109. In FIG. 2 it is hard to make a difference between the groove and the coil heater. The segment 100*a* of FIG. 2 is provided with grooves 101 for guiding the cooling air. The air is heated when flowing through the grooves.

Figure 3:
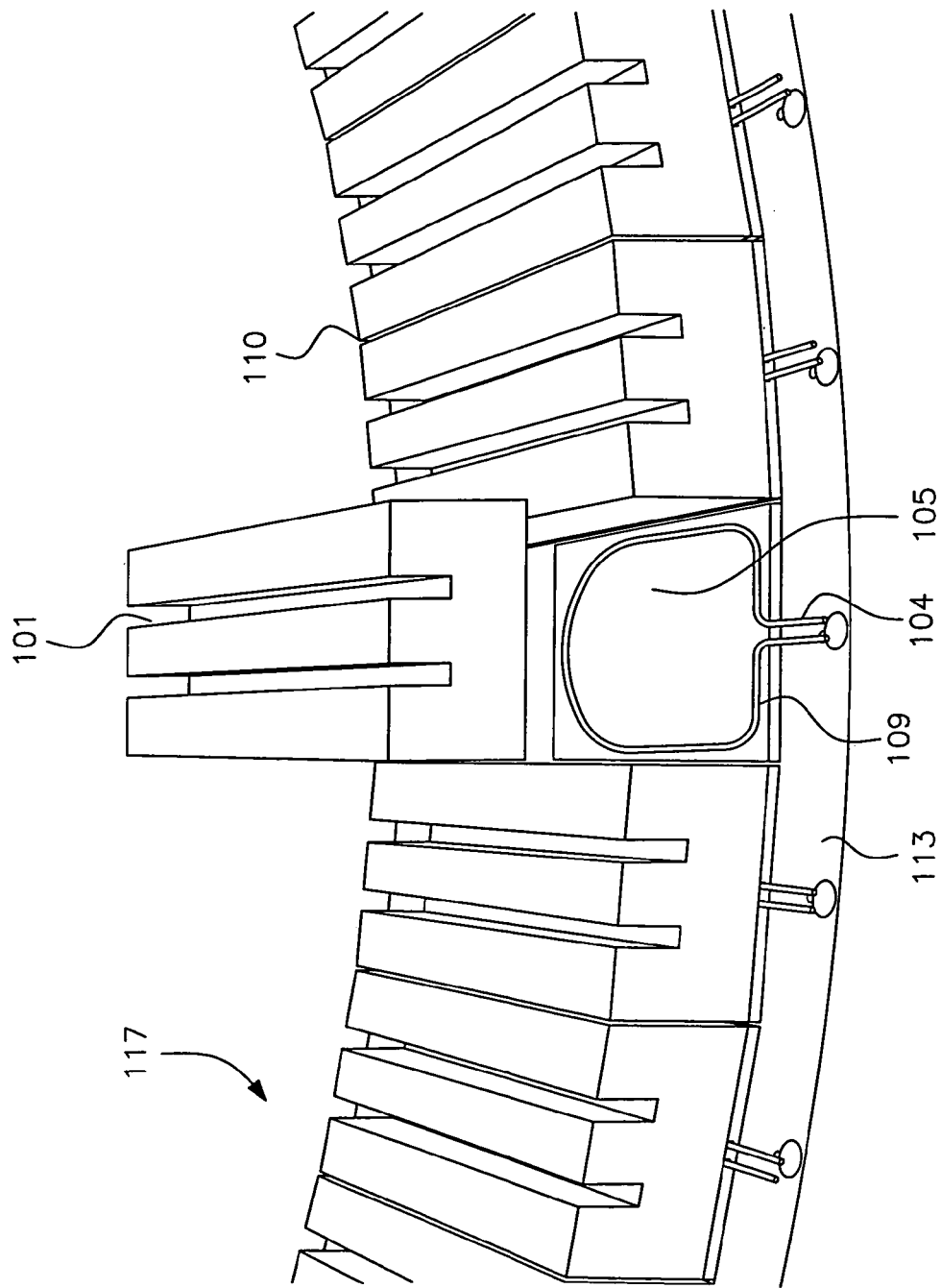
FIG. 3 shows a plurality of segments as shown in FIG. 2 arranged in the air ring, in accordance with the present invention.

FIG. 3 illustrates one way the segments 10*a* of FIG. 2 may be arranged around the gauge. The segments 10*a* have a slightly conical form and the way they are arranged reminds one of pieces of a cake. Furthermore, FIG. 3 shows that the different segments are spaced apart from each other so that gaps 110 between the segments 10*a* are formed. The hot plate 104 is fixed at the base portion 106 of the segment 100*a* with screws. These screws and the respective holes in the hot plate are not shown in FIGS. 2 and 3. In FIG. 3, both the segments 100*a* and the hot plates 104 are fixed on the base plate 113 of an air ring 117. FIG. 3 only shows a section of such an air ring.

Figure 4:
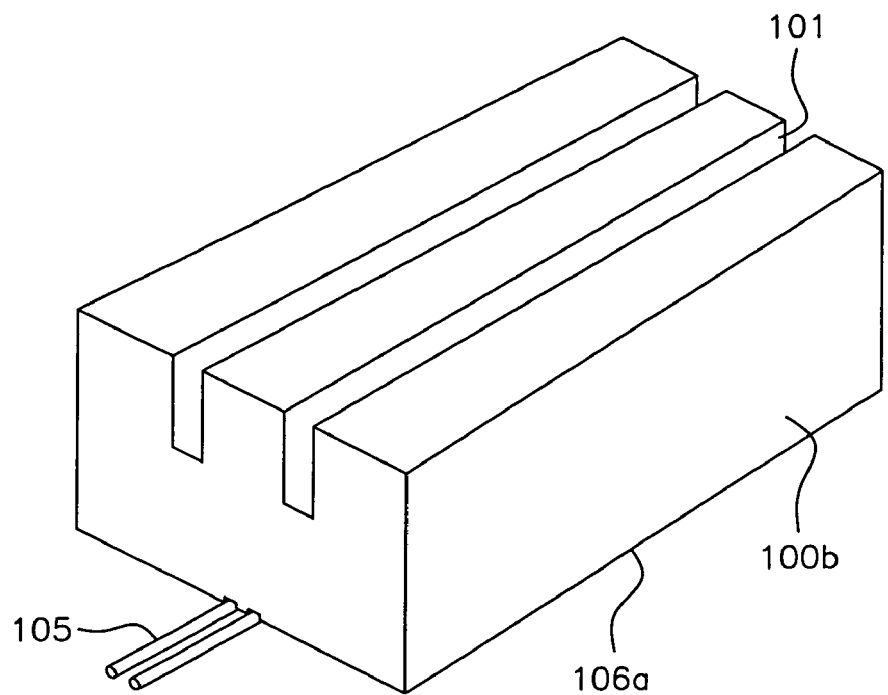
FIG. 4 is a sketch of a third preferred embodiment of a segment, according to the present invention.
Figure 5:
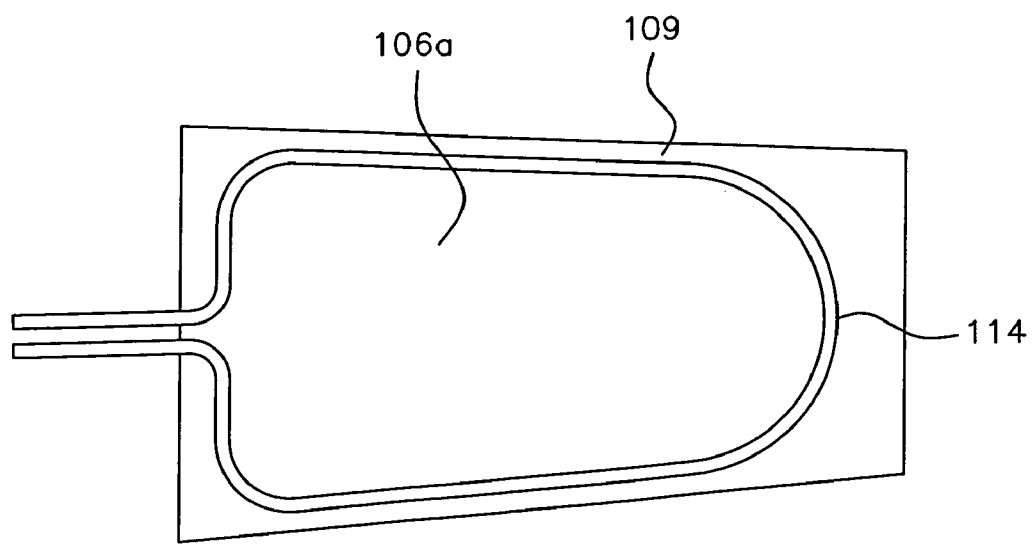
FIG. 5 is a plain view of the bottom region of the segment shown in FIG. 4.

FIG. 4 shows another segment 100*b* which is shaped in a comparable way as the segment 100*a* shown in FIG. 2. The difference is that the bottom of the base 106*a*, shown in FIG. 5, of the segment 100*b* is provided with the groove 114 in which a flexible coil heater is arranged in a comparable way as in the groove 108 of the hot plate 104. The advantage of such an arrangement can be seen in the more direct connection between the heating means, that is to say the coil heater 109, and the segment 100*b*. In contrast to the embodiment shown in FIG. 3, the embodiment shown in FIG. 4 bears no risk of an air gap which can arise between the hot plate 104 and the bottom of the base portion 106 of the embodiment shown in FIG. 2. Such an air gap can decrease and slow down the transfer of heat from the hot plate 104 to the segment 100*a*.

Figure 6:
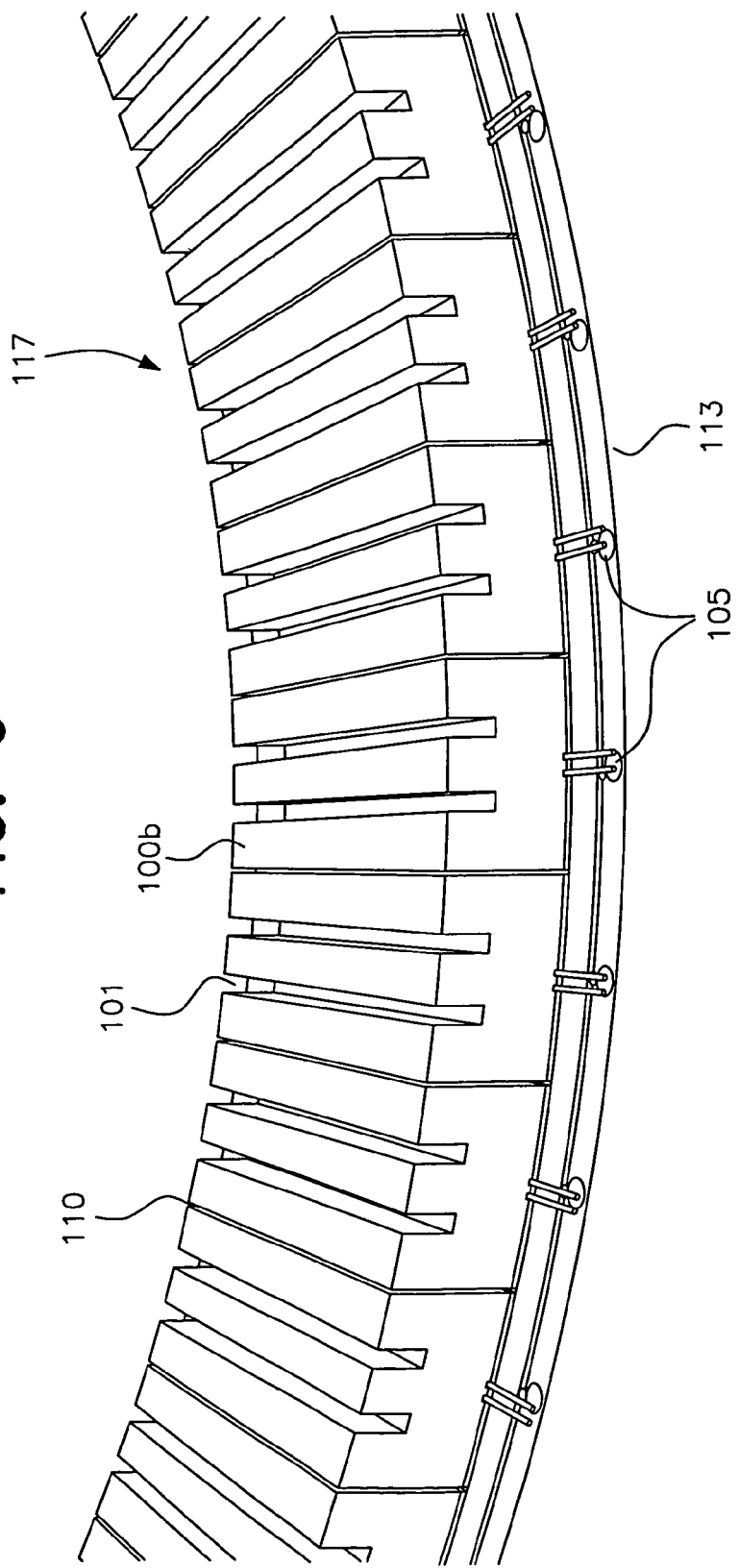
FIG. 6 shows a plurality of segments as shown in FIG. 4 arranged in the air ring, in accordance with the present invention.

FIG. 6 shows once again the way in which the segments shown in FIG. 4 are arranged on the base plate 113 of the air ring 117.

FIG. 7*a* shows another segment 100*c* which is provided with holes 102 for guiding the cooling air. This segment can be heated by a hot plate in which the heat is produced by a current which flows once again through the electric connectors 105. The hot plate 104 can be pushed in the segment 100*c* like a drawer. The orifice 115 in the segment 100*c* which serves for receiving the hot plate like a drawer can be produced by wire erosion or with a milling machine. It is possible to provide one segment with a plurality of orifices to receive a plurality of hot plates 104. FIG. 7*b* shows the way the segments 100*c* of FIG. 7*a* are arranged in an air ring 117.

FIG. 8 shows an exploded view of another embodiment of a segment 100*d* which is sandwiched between two hot plates 104*a*, 104*b* which can be fixed on top and on the bottom of the segment 100*d* by any fixing means such as screws. The segment 106*d* is once again provided with holes 102 for guiding the cooling air to the plastic gauge 111 (see FIG. 9). The holes 116 in the hotplates 104*a*, 104*b*, which are for receiving the screws, are also shown in FIG. 8.

Figure 9:
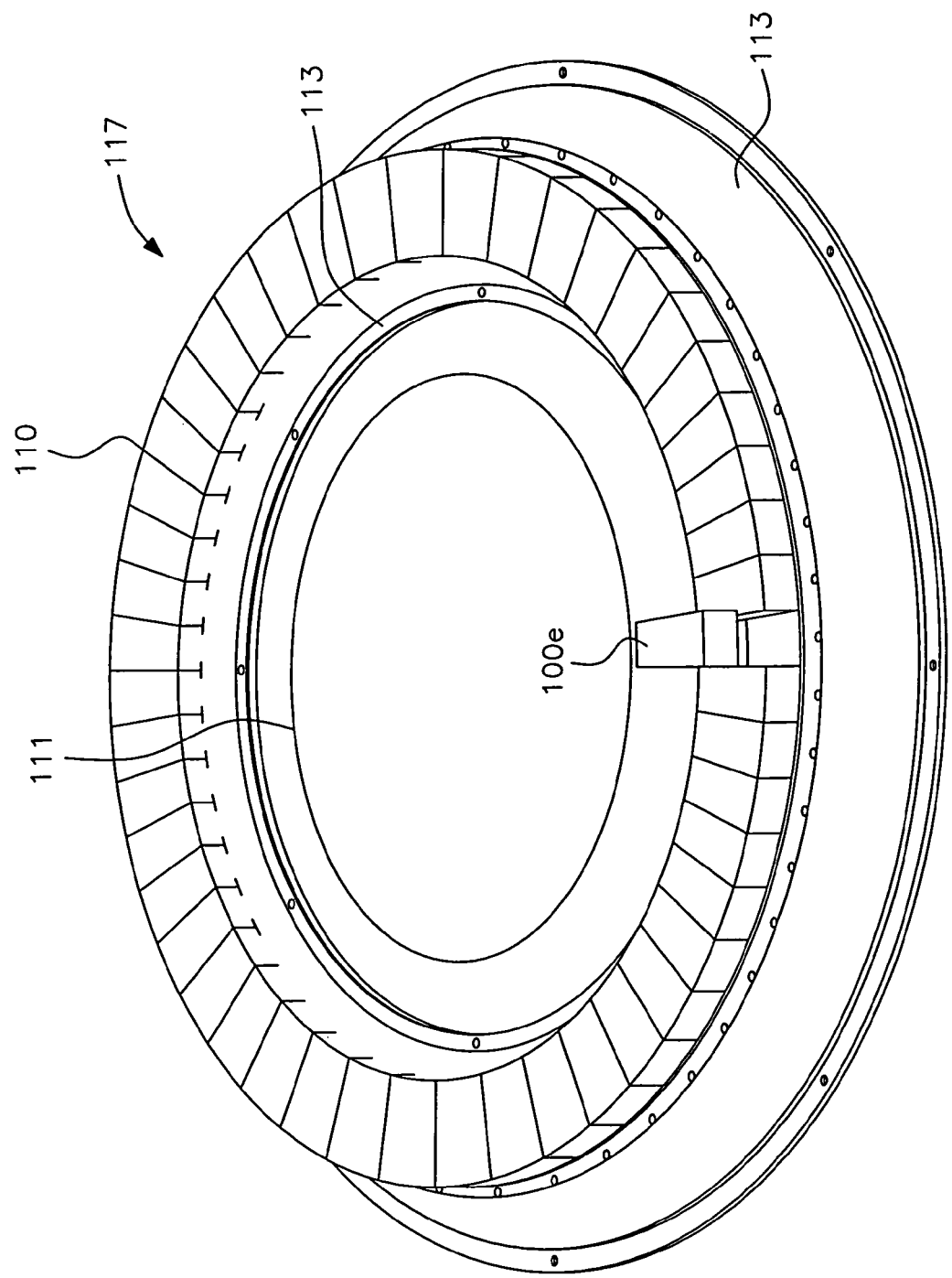
FIG. 9 is a sketch of an opened air ring having a plurality of segments according to a sixth embodiment of the present invention.

FIG. 9 provides a sketch of another way in which segments 100*e* may be arranged around a plastic film gauge 111 which is shown in cross-section in FIG. 9. The housing of the air ring 117 is not shown.

In contrast to the already shown segments 100, 100*a*, 100*b*, 100*c*, 100*d*, the segments 100*e* shown in FIG. 9 are monolithic and do not contain any grooves or holes for guiding the cooling air. The segments 100*e* shown in FIG. 9 selectively heat the cooling air which passes by their surfaces. As in FIG. 3, FIG. 9 shows also the base plate 113 of the air ring on which the segments are mounted. FIG. 9 also shows small gaps 110 between neighbouring segments 100*e*.

Figure 10:
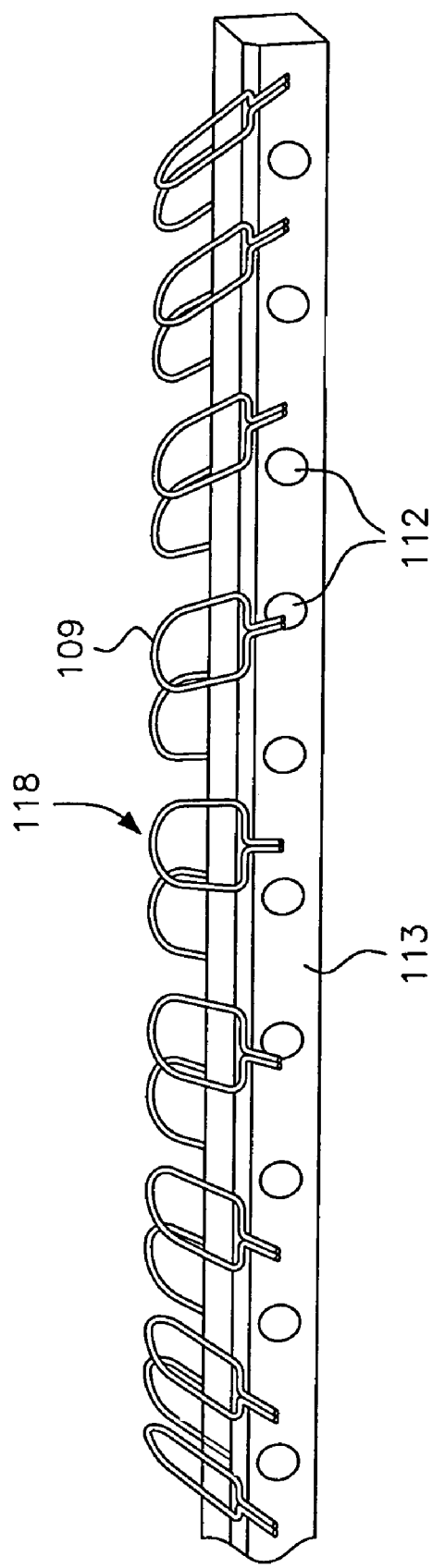
FIG. 10 is a sketch of a section of yet another embodiment of an air ring according to the present invention.

FIG. 10 shows a sector of a different air ring 118 which is not provided with any segments. This air ring is provided with coil heaters 109 which can be individually heated. The coil heaters are arranged directly in the air flow path. In FIG. 10 the air ring is additionally provided with holes 112 for guiding parts of the cooling air. The casing of the air ring is not shown.

Figure 11:
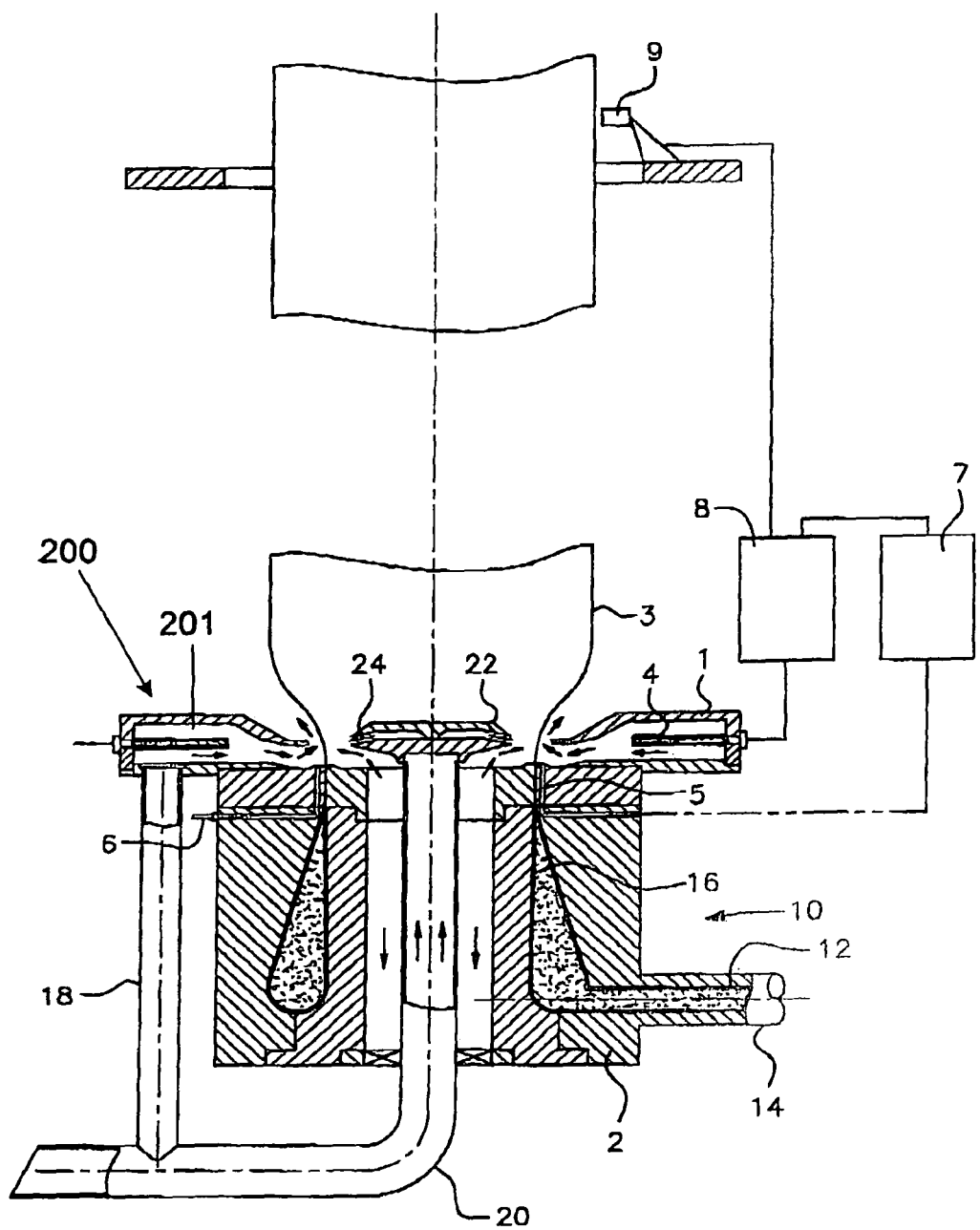
FIG. 11 is an embodiment example of an inventive film die, which is illustrated at a vertical section, in accordance with the present invention.

FIG. 11 shows a whole system for producing blown plastic film. This system can be provided with any air ring or any kind of segment or heating means described or claimed by the present application. The synthetic fused material molten plastic 12 is fed to the film die 10 from the schematically arranged extruder via an adapter fitting 14. The synthetic fused material is then directed to a ring manifold channel 16 for its distribution, which then ends into the ring-shaped discharge nozzle. The partially sectional film tube 3 is discharged from the ring-shaped nozzle gap (annular die), which is embodied with two die rings. A cooling ring 1 having an outer wall generally designated by reference numeral 200 which defines a generally annular plenum 201 is located on the exterior die ring, which directs cooling air onto the extruded tubular film 3 directly above the die ring.

The cooling air being fed is mutually delivered by means of a blower for interior and exterior cooling (not illustrated), and fed to a connecting pipe 18 to the exterior cooling ring 1, or via a pipe 20 to the interior cooling ring 22, the discharge gap 24 of which is preferably tilted toward the bottom, or is simply arranged to blow radially toward the exterior so that the sharply bundled air jet hits the interior side of the film tube at about the same height as that of the exterior air jet. The general construction of the film die as seen in FIG. 11 is known from DE 1 96 09 62 A, or from DE 42 07 439 A, to which reference is made for purposes of simplifying any additional description.

Heating rods that are evenly distributed across the circumference are arranged in the exterior cooling ring 1 of the film die according to the invention, which protrude radially from the exterior to the interior. As is indicated in FIG. 11, the heating rods 4 are arranged in the ring-shaped exterior wall 200 that defines the plenum 201 of the exterior cooling ring 1. The heating rods 4 are equipped with heating cartridges, which can be activated independently of one another.

In this embodiment, heating means such as heating cartridges 5 are evenly distributed across the circumference. The heating means of the ring can be activated independently of one another. They are arranged in the film die 10 next to the exterior cooling ring 1 with the heating rods 4 in the area of the ring-shaped discharge nozzle. These heating cartridges 5 provide for a further possibility to locally vary the temperature of the molten plastic. The additional variation with the air ring bears some positive effects, as described in Canadian Patent No. 2,438,493.

In the upper area of the film tube bubble, i.e., in the area after the front pipe, a thickness measurement unit 9 is arranged for the measurement of the thickness of the film tube. The corresponding measurement readings are fed to a data processing and control unit 8 for the heating rods 4 in the exterior cooling ring. The readings are then transmitted from this data processing and control unit 8 to a data processing and control unit 7 for the heating cartridges 5 in the film die.

The embodiment illustrated additionally provides air pipes 6 in the film die, which are aligned essentially vertical to the exterior cooling ring, as illustrated. The air pipes 6 distributed across the circumference are also integrated in the film die 10.

Variably heated or cooled air, which hits the cooling air stream in the manner illustrated, which is discharged from the nozzle gap of the exterior cooling ring 1, can then be fed through the air pipes 6 in a controlled manner. Here it is also possible, for example, to vary the volume flow of the air, which is fed through the air pipes 6.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

We claim:

1. An air ring for controlling gauge of blown plastic film of an extruded plastic tube comprising:
   a) a generally annular plenum;
   b) an annular orifice for discharging cooling air against an extruded plastic tube passing through the air ring;
   c) an air flow path for cooling air between said plenum and said annular orifice, said air flow path being segmented along a circumference of the annular plenum by a plurality of segments each having an upper surface and a lower surface, said segments including a material with high heat conductivity, each segment having axially directed grooves formed in one of said upper and lower surfaces to form a grooved side, with said grooves guiding the air from the annular plenum to the orifice; and
   d) each of said segments having an integrated heating element for individually and selectively heating said segments of the air flow path such that the temperature of cooling air discharged against said extruded plastic tube can be locally varied, said heating element being adjacent to a side of said segment opposite said grooved side and heating the air as the air flows through said grooves.

2. The air ring according to claim 1, wherein the material with high heat conductivity is metal.

3. The air ring according to claim 2, wherein the material with high heat conductivity is aluminum.

4. The air ring according to claim 1, wherein the heating elements include at least one cartridge heater.

5. The air ring according to claim 1, wherein the heating elements include at least one coil heater.

6. The air ring according to claim 1, wherein the heating elements include an induction heater.

7. The air ring according to claim 1, wherein the heating elements include a hot plate.

8. The air ring according to claim 1, wherein the heating elements include a gas heater.

9. The air ring according to claim 6, wherein the heating elements include at least one hotplate which includes at least one coil heater.

10. The air ring according to the claim 7, wherein the hotplate is introduced into a segment like a drawer.

11. The air ring according to the claim 7, wherein two different hotplates are introduced in a segment like drawers.

12. The air ring according to claim 1, wherein at least two of the segments are spaced from each other so as to form an air gap which contributes to the mutually thermal isolation of the segments.

13. The air ring according to claim 12, wherein at least one isolating element is provided for improving the thermal isolation between the segments.

14. The air ring according to claim 13, wherein at least one isolating element includes at least one of ceramic, fluoropolymer materials, other polymer materials, silicone and a vacuum or air chamber.

15. The air ring according to claim 1, wherein said air ring is incorporated within a system for producing blown plastic film having an extruder, an annular die and a thickness measurement system.

16. The air ring according to claim 1, wherein the segments have elongated pathways therein for guiding the cooling air.

17. The air ring according to claim 1, wherein for each segment said upper surface is the grooved side and said heating element is adjacent the lower surface in a base portion of said segment.

* * * * *